(12) United States Patent
Dholakia

(10) Patent No.: US 10,682,591 B1
(45) Date of Patent: Jun. 16, 2020

(54) METHOD FOR FILTERING CONTAMINATED WATER

(71) Applicants: Dipen M Patel, San Ramon, CA (US); Rupal D Patel, San Ramon, CA (US)

(72) Inventor: Jayant M Dholakia, Chandler, AZ (US)

( * ) Notice: Subject to any disclaimer, the term of this patent is extended or adjusted under 35 U.S.C. 154(b) by 228 days.

(21) Appl. No.: 15/889,207

(22) Filed: Feb. 6, 2018

(51) Int. Cl.
| | | |
|---|---|---|
| B01D 24/20 | (2006.01) | |
| C02F 1/00 | (2006.01) | |
| B01D 39/04 | (2006.01) | |
| C02F 103/00 | (2006.01) | |

(52) U.S. Cl.
CPC ............ *B01D 24/20* (2013.01); *B01D 39/04* (2013.01); *C02F 1/004* (2013.01); *C02F 2103/001* (2013.01)

(58) Field of Classification Search
CPC ...... B01D 24/20; B01D 24/205; B01D 39/04; C02F 2103/001
See application file for complete search history.

(56) References Cited

U.S. PATENT DOCUMENTS

| | | |
|---|---|---|
| 406,189 A | 7/1889 | Baker |
| 631,128 A | 8/1899 | Ricketts |
| 3,044,628 A | 7/1962 | Heijnis |
| 3,146,189 A | 8/1964 | Kunreuther |
| 3,875,055 A | 4/1975 | Grosboll |
| 3,876,546 A | 4/1975 | Hsiung |
| 3,960,508 A | 6/1976 | Bessant |
| 4,235,724 A | 11/1980 | Ginaven |
| 4,904,456 A | 2/1990 | Anderson |
| 5,024,771 A | 6/1991 | Chiarito |
| 5,281,332 A | 1/1994 | Vandervelde |
| 5,474,586 A | 12/1995 | Eaton |
| 5,492,635 A | 2/1996 | Ball |
| 5,707,527 A | 1/1998 | Knutsen |
| 6,337,025 B1 | 1/2002 | Clemenson |
| 6,533,941 B2 | 3/2003 | Butler |
| 6,649,048 B2 | 11/2003 | de Ridder |
| 7,045,067 B2 | 5/2006 | Brown |
| 7,163,630 B2 | 1/2007 | Chilcote |
| 7,419,591 B2 | 9/2008 | Aberle |
| 8,192,635 B2 | 6/2012 | Dholakia |
| 9,884,272 B1 | 2/2018 | Dholakia |
| 2015/0101981 A1* | 4/2015 | Lennox ..................... C02F 3/06 210/615 |

OTHER PUBLICATIONS

Pending Related Patent Applications (Unpublished): U.S. Appl. No. 15/884,387, filed Jan. 31, 2018 U.S. Appl. No. 15/813,158, filed Nov. 15, 2017.

* cited by examiner

Primary Examiner — Benjamin M Kurtz

(57) ABSTRACT

A method for forming a filter for passing contaminated water using elements that are made wholly or partly of degradable material. The increased area available for flow is obtained by providing a first media for which the increase in area for passing the contaminated water is desired, adding a second media comprising of a plurality of degradable elements, and allowing the elements of to degrade to bring about an increase in the area available for passing the contaminated water.

20 Claims, 3 Drawing Sheets

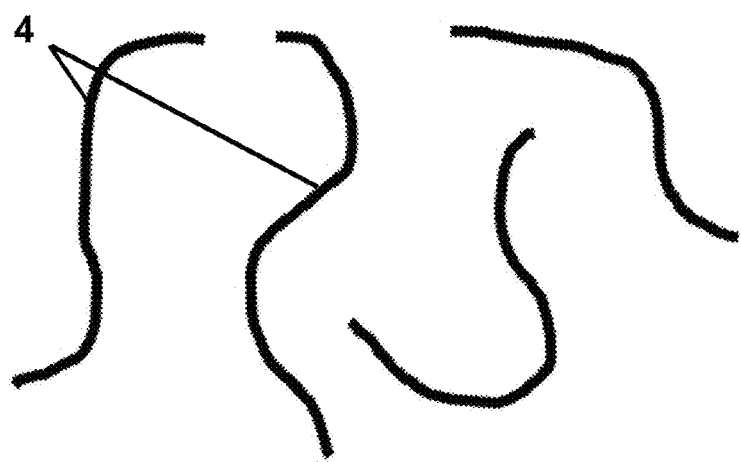
Fig. 1-A
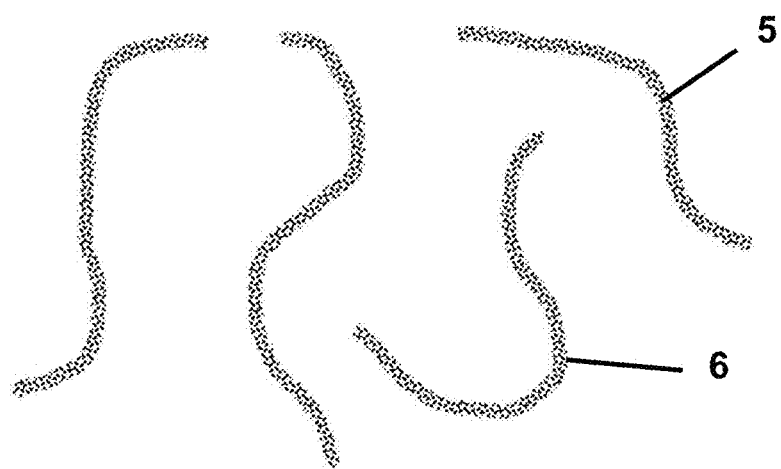
Fig. 1-B

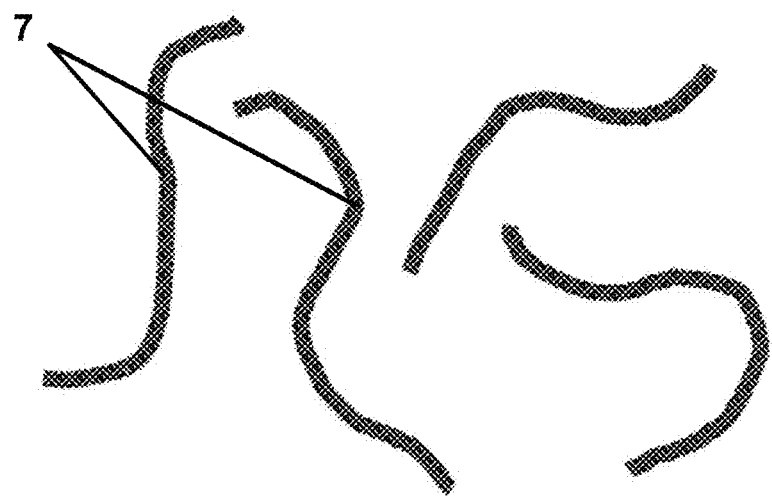
Fig. 2-A
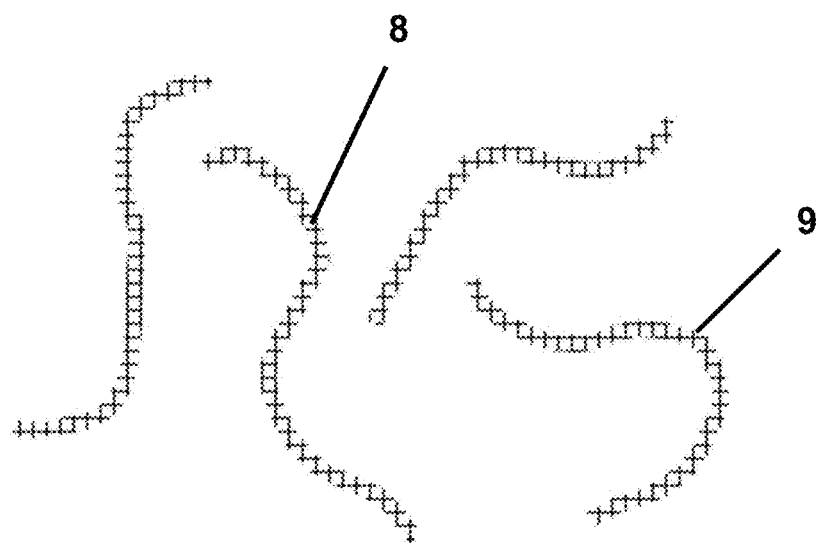
Fig. 2-B

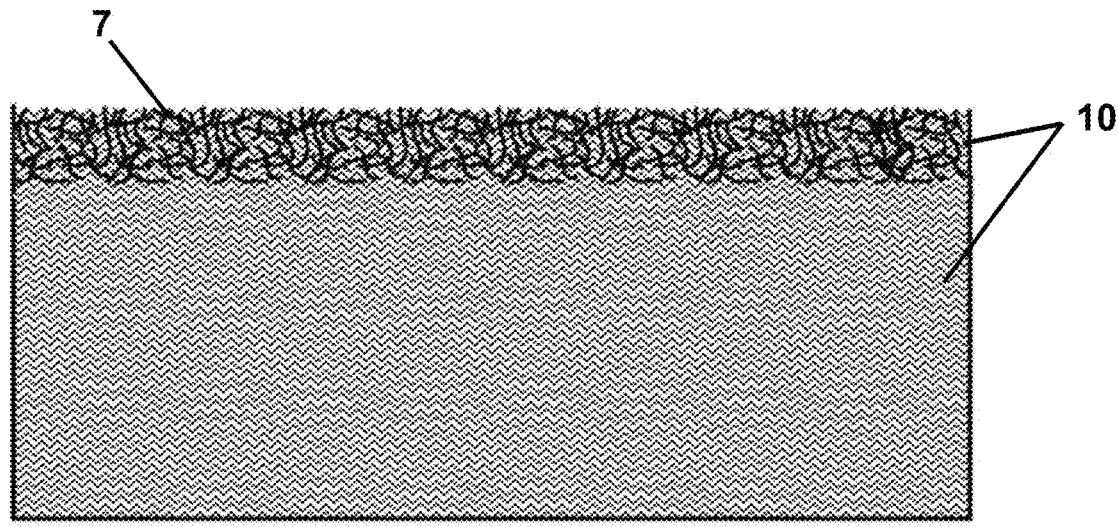
Fig. 3-A
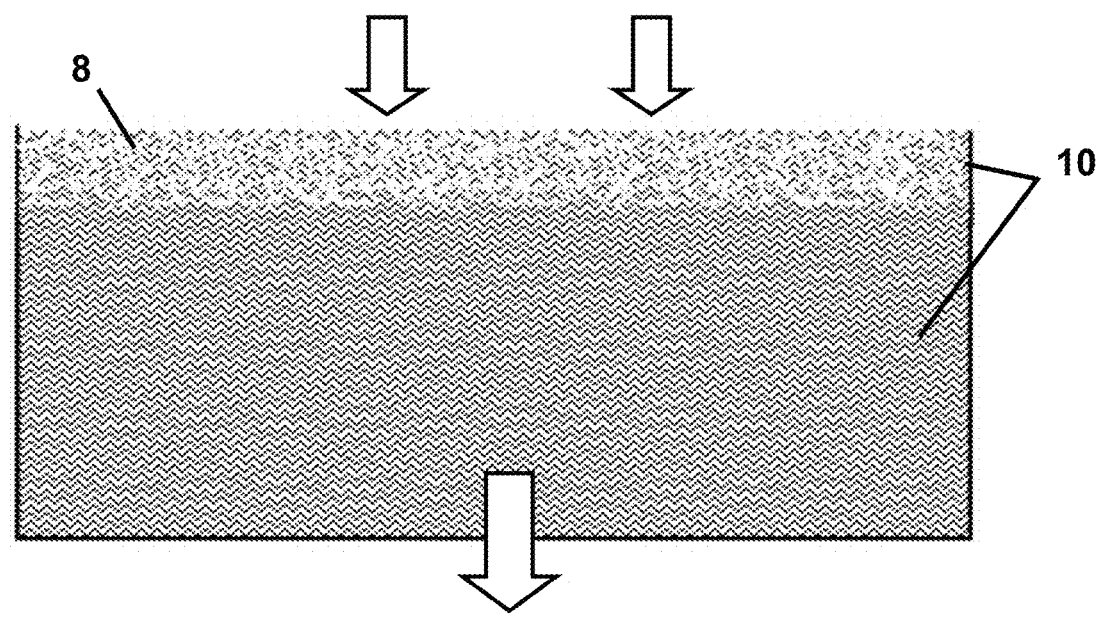
Fig. 3-B

METHOD FOR FILTERING CONTAMINATED WATER

CROSS-REFERENCE TO RELATED APPLICATIONS

This application is related to application Ser. No. 14/120,231, filed May 12, 2014, now pending, application Ser. No. 15/813,158, filed Nov. 15, 2017, now pending, and application Ser. No. 15/884,387, filed Jan. 31, 2018, now pending.

FEDERALLY SPONSORED RESEARCH

Not Applicable

SEQUENCE LISTING OR PROGRAM

Not Applicable

BACKGROUND

Field of Invention

The present application relates to the treatment of contaminated water such as stormwater runoff, wastewater, and agricultural return flows.

Prior Art

One of the most significant drawbacks of contaminated water treatment systems, such as filtration and infiltration systems, is clogging of the porous media due to buildup of solids, including particles and microbial biomass. As particles become trapped or biomass growth increases, the permeability of the media gradually decreases and eventually the media clogs and is unable to pass the desired flow of contaminated water. Permeability is a measure the ability of the porous media to pass water.

In industrial and drinking water treatment, filters are backwashed periodically to restore hydraulic flow, or other mechanical methods may be used. This is not possible in filtration and infiltration practices which operate passively under gravity filtration, such as those used for stormwater and wastewater treatment. Many of these practices incorporate some combination of filter media, hydrodynamic sediment removal, oil and grease removal, or screening to remove floatables and particles that could prematurely blind the filter media. A typical sand filter includes a pretreatment or sedimentation chamber that prolongs filter media life by removing floatables and heavier suspended solids. Soil filters are normally combined with pretreatment such as grass strips or swales, or sediment basins to prevent premature clogging. Dual layer filters in which a coarse grain size media layer is on top of a finer grain size layer is another technique used to prolong the hydraulic life of filters by increasing depth filtration. Ultra-urban filter devices incorporate vertical flows or use relatively coarser media or media in pellet form to prevent premature clogging of the media. In general, the trade off is between using small grain size filter media which improves treatment but results in quicker clogging, and using coarser grain size media which provides poorer treatment but prolongs hydraulic capacity.

Conventional filtration media such as sand are durable and do not undergo significant degradation when exposed to an environment (e.g., microorganisms, light, heat, stress, hydrolysis, oxidation) over tens, hundreds, or more years. Degradable media, for example media made of degradable materials such as degradable polymers or degradable composites, are never selected for filtration of contaminated water because degradable materials have a time span for degradation that is substantially shorter than that for conventional materials. Degradation is defined as a process of change in the structure of a material resulting in a significant loss of properties (e.g., integrity, weight, structure, mechanical strength, substance) and/or fragmentation into smaller pieces when exposed to an environment (e.g., microorganisms, light, heat, stress, hydrolysis, oxidation).

It is an object of this new method to use degradable elements to improve the service life of filters used for passing (treating) contaminated water such as, but not limited to, stormwater runoff, wastewater, and agricultural return flows. It is also an object of this method to provide some treatment of contaminated water by removing pollutants and particles.

SUMMARY

Presented is a method for prolonging the service life of contaminated water filters by increasing the area available to pass the contaminated water flow. The increased area for flow is created using a plurality of degradable elements that are made wholly or partly of degradable material. The primary advantage of this method over the prior art is a substantial increase in the area available for flow that is provided when the elements degrade, resulting in a reduced rate of clogging of the media and increase in service life.

DRAWINGS

FIG. 1-A Shows example elements of degradable media of organic shape.

FIG. 1-B Shows example organic shape elements following degradation into granular media.

FIG. 2-A Shows example elements of degradable media of organic shape.

FIG. 2-B Shows example organic shape elements following degradation into porous matrices.

FIG. 3-A Shows a plurality of organic shape degradable media elements in a filter bed.

FIG. 3-B Shows a plurality of the high surface area regions created upon degradation of organic shape elements in a filter bed.

DETAILED DESCRIPTION

A method is presented for forming a filter using a plurality of degradable elements. Preferably, the degradable elements are granular. The term "granular" refers to a media or material that is comprised of discrete elements such as granules, fragments, elements, fibers, fines, pellets, chips, powders, flakes, beads, spheres, or filings. Granular media are generally porous because of the presence of voids between the elements. A porous media or medium is any material or substance containing pores or voids. The degradable elements can be used directly as filter media or can be added (mixed with) other media for which the increase in area for passing flow is desired. The filter formed by the method can be used for passing (treating) contaminated water such as, but not limited to, stormwater runoff, wastewater, and agricultural return flows. Examples of filters formed using the method include granular filters, such as sand filters and soil filters used to infiltrate contaminated water.

The degradable elements used in this new method are of any shape or size. The elements can be of geometric (regular) shapes, organic (irregular) shapes, or any combination of these. Geometric shapes generally have straight lines and defined angles, and include shapes such as "candles" (e.g., cylindrical, prism, spherical, conical, or other shape) and elongated "fins" (e.g., rectangular, triangular, or other cross-section). Organic shapes are generally more irregular and asymmetrical, and include shapes with no discernable shape (e.g., dendritic or plant root shapes). The elements can be any of a large variety of predetermined shapes and sizes, and can be solid or hollow. The size and shape of the elements is selected based on a number of factors, including the severity of the clogging problem, method of degradation, need for ease of installation, area of filter, depth of filter, and media type.

The surface or contact area of the elements can vary depending on the application. The surface or contact area, which is the area of the outside of the elements, depends on the shape and dimensions of the elements (e.g., length, width). Preferably, the surface area of the elements is at least 2 times the smallest face area (area of the smallest face) of the elements, or more preferably at least 20 times the smallest face area, or even more preferably at least 50 times the smallest face area. There are a number of ways of determining the surface area and smallest face area. These include, but are not limited to, the following. For geometric shapes, the surface area and area of the smallest face can be based on known dimensions. For organic shapes, the shapes can be divided into one or more approximately geometric shapes for the purposes of estimating areas. For both geometric and organic shape elements, areas can be based on mean measurements of randomly selected elements if a variety of shapes and sizes are present. For example, variable size elements can be used with organic shapes such as root shape where surface area increases with increase in length. To increase depth filtration, elements of relatively longer length (longest dimension) are expected to be more beneficial because upon degradation they can provide longer flow paths below the filter surface where clogging is typically worst. Preferably, the length of the elements is at least 2 inches, or more preferably the length of the elements is at least 3 inches, or even more preferably the length of the elements is at least 4 inches. Even longer lengths may be preferred for applications where media depth is less constrained such as deep bed filtration or infiltration into soils. The length and surface area of the elements is not limited to these preferred ranges or values, but is selected depending on, for example, the severity of the clogging.

The elements are made wholly or partly of degradable material, such as degradable polymer or degradable composite. The term "degradable material" means a material for which the time span for degradation is substantially shorter than that for conventional materials. The degradable materials used for the elements are capable of a significant change in properties (e.g., integrity, weight, structure, mechanical strength, substance, composition) and/or fragmentation into smaller pieces when exposed to an environment (e.g., microorganisms, light, heat, stress, hydrolysis, oxidation). The term "significant change in properties" means a change in properties that is sufficient to produce the desired result of increasing the area available to pass the contaminated water. Examples of significant change in properties include, but are not limited to, degradation of elements into smaller granular media, degradation of partially degradable composite elements into conventional granular media, and degradation of partially degradable composite elements into conventional material such as mesh screen, foam, or porous matrix.

Preferably, the degradable material for the elements is selected so that the elements degrade (undergo degradation) prior to clogging of the filter media. In this case, the filter media is the installed media comprising of both degradable elements and elements of the media for which the increase in area is desired. The term "installed media" refers to media that has been placed in the field and is ready for use. The term "clogging" means a significant reduction in permeability and deterioration in the ability of the media to pass the contaminated water to the extent that it no longer passes the desired flow rate. For example, clogging can be assumed to occur within about 5 years for a media that is expected to be incapable of passing a design or regulatory filtration rate or infiltration rate after about 5 years of use. Another example is a time for clogging of about 1 year for a media that is expected to have substantial head loss or overflows after about 1 year of use. The time span to failure or clogging can be estimated using a number of different ways. For example, it can be estimated from previous applications of the new method or knowledge of failure times for the unimproved media (the media for which the increase in area is desired).

It may be desirable to achieve degradation during or shortly after installation, or in about a few days or weeks after installation when the media is used in situations where loading rates are relatively high and failure due to clogging is expected to occur relatively quickly (e.g., within about a month or two months or during the first year of use). In these cases, the degradable material can be one that can be manually degraded or that readily degrades in the environment it is expected to be exposed to. In another example, a material that is capable of undergoing degradation within about a year may be sufficient for situations where clogging is not expected to occur for about two or three years, while a material that is capable of undergoing degradation within about 5 years may be sufficient for situations where the loading rates are relatively low and clogging is not expected to occur within about 6 or more years. A degradable material that is capable of degrading within about 10 years following installation is expected to be sufficient for most, but not all, applications.

There are many examples of elements made wholly or partly of degradable material including but not limited to the following. The elements can be made wholly of degradable material that degrades into even smaller element media to provide the desired increase in area. For example, elements can be a composite of two or more types of degradable material which degrade into a porous media during normal use, but are capable of degrading within a period of time into basic chemical units for disposal purposes. The elements can be partly made of degradable material and partly of conventional material. Examples include elements made of a conventional granular media and a degradable resin, or elements made of conventional mesh screen, foam, or porous matrix covered by degradable material. A matrix is any open grid structure that provides voids through which water can pass. Elements made of conventional screen or porous material, such as mesh or ceramic, covered with degradable material can degrade into the conventional screen or porous material. As an alternative to this, the mesh, screen, or porous matrix elements can be made of material that is not conventional but instead degrades at a rate that is much slower than the covering degradable material but is still considered degradable for the purposes of disposal. Another example is elements that comprise of porous foam filter material wholly or partly covered by degradable material. Yet another example is elements that comprise geotextile filter material wholly or partly covered by degradable material. Use of degradable material can provide protection of the conventional material and ensure that pores in the conventional material are not blocked during installation.

Preferably, the elements are capable of being in the range about 50 to 100 percent, or more preferably in the range about 80 to 100 percent, or even more preferably in the range about 90 to 100 percent, degraded after installation of the media. The terms "about 50 percent", "about 80 percent", or "about 100 percent" mean that, after installation, about 50 percent, or about 80 percent, or about 100 percent of the element material can be degraded essentially to smaller elements such as fragments or other granular material, or into elements comprising of conventional porous structures such as mesh screen, foam, porous matrix, and other porous materials. Preferably, the elements are capable of degrading in the range about 50 to 100 percent, or more preferably in the range about 80 to 100 percent, or even more preferably in the range about 90 to 100 percent, within about 10 years after installation, and more preferably within about 5 years after installation, and even more preferably within about one year after installation of the media. The term "after installation" refers to media that has been placed in the field and is ready for use. If desired, even more rapid degradation, for example during installation or within about a few hours, days, or weeks following installation of the media, can be induced by manual means (e.g., adding water to facilitate degradation of elements made of material that can be degraded hydrolytically). The ranges for the degree of degradation and time span of degradation are not limited to the preferred ranges but depend on expected time for clogging, loading rates, properties of media for which the increase in area is desired, and other factors.

Degradable materials that can be used for the elements can be natural, synthetic, or any combination of the two, and can be capable of degrading by any number of processes, including, but not limited to, biodegradation, photodegradation, hydrolytic degradation, thermal degradation, oxidative degradation, mechanical degradation, or any combination of these. A biodegradable material, such as a biodegradable polymer or biodegradable composite, is a material that can degrade owing to the action of micro- and/or macroorganisms or enzymes. The rate of biodegradation can vary depending on the nature of the functional group and degree of complexity. Biodegradation processes can occur in a number of ways, including, but not limited to, processes that result in mechanical damage, direct enzymatic effects leading to breakdown of the material structure, and secondary biochemical effects caused by excretion of substances that can directly affect the material or change environmental conditions, such as pH or redox conditions. Microorganisms produce enzymes that catalyze reactions by combining with a specific substrate or combination of substrates. A photodegradable material, such as a photodegradable polymer or photodegradable composite, is a material in which degradation results from the action of light such as daylight or sunlight. A hydrolytically degradable material, such as a hydrolytically degradable polymer or hydrolytically degradable composite, is a material in which degradation results from hydrolysis. A thermally degradable material, such as a thermally degradable polymer or thermally degradable composite, is a material which degrades when heated or when exposed to relatively high temperatures. An oxidatively degradable material, such as an oxidatively degradable or oxo-biodegradable polymer or oxidatively degradable composite, is a material in which degradation results from oxidation. A mechanically degradable material is one that breaks down relatively easily when force is applied.

There are a large and growing number of materials that are degradable materials that can be used to produce the degradable elements or can be used as additive, fillers, binders or catalysts to produce degradable elements. Degradable materials can be natural materials, synthetic materials, or a combination of the two, and include, but are not limited to, proteins (e.g., wheat, soy, zein), polysaccharides (e.g., chitin, cellulose, starch, dextran, xanthan, pectin, alginate), and polymers (e.g., degradable polyesters, degradable PP, PGA, PLA, PHA, PHB, PCL, PVOH, EVOH, PBS/PBSA polyesters, PEF, biodegradable PET, copolyesters, polyvinyl alcohol, polyamides, Biomax®, Biopol®, polyurethanes, polyolefins, modified PET, degradable polypropylene), as well as blends of these and other materials. Increasingly, additives are added to conventional polymers and degradable polymers to impart controlled degradation behavior (e.g., catalytic transition metal compounds such as cobalt stearate or manganese stearate). Degradable materials that are composites are materials that are made from two or more materials that are different, for example materials with different degradation behavior because of different compositions, properties, or structure. Composite materials can include materials with both conventional and degradable components, for example a material with conventional or relatively low degradation rate elements bonded together by a degradable resin or bonding agent.

A plurality of elements is added to the media for which the increase in area to pass the contaminated flow is desired. Degradation of the elements results in a plurality of high surface area regions within the media where the elements were located. These high surface area regions comprise of porous media such as granular media, porous structures such as hollow mesh screen, foam material, matrix, or other porous materials. The porous structures or materials resulting from degradation of the elements allow flows to travel deeper into the media before entering the media at the interfaces between the high surface area regions and the media. The porous structures or materials also provide separation from the media particles and prevent the high surface area regions from collapsing. This is achieved by appropriate sizing and selection of the materials that are used to form the elements. For example, granular media used to form degradable elements can be sized so that void openings are sufficiently small to prevent media particles from entering and collapsing the high surface area regions. Another example is selection and use of appropriately sized porous screening materials such as mesh screen, fabric, geotextile or other means. Depending on the length of the elements, the high surface area regions can increase depth filtration since they can provide a means for flows to travel deeper into the media before entering the media. Degradation of relatively longer elements may result in high surface area regions that comprise of macropore channels similar to worm holes. These macropore channels can provide transport pathways into the media and increase depth filtration.

Following installation, the elements are allowed to degrade to bring about an increase in the area available to pass the contaminated water. The term "allowed to degrade", and similar terms such as "allowing the elements to degrade" used elsewhere, mean that the elements or degradable materials used for the elements are allowed to undergo degradation through processes that result from the environment they are placed in, and includes processes that are induced manually. The term "increase in the area available to pass the contaminated water" means an increase in the surface area of the media that is exposed to the contaminated water.

The actual time for the elements to degrade will vary depending on, for example, the materials used, the dimensions of the elements, and the environmental conditions. The rate and manner of degradation of the elements is affected by a number of factors, including, but not limited to, temperature, availability of oxygen or lack of it, burial and depth of burial of the product, humidity or wetness, rainfall, size, weight, surface area of elements, media composition, including polymer type, molecular weight, crystallinity, orientation, surface-to-volume ratio, pH, and environment in which the elements rest. For example, elements made of hydrolytically degradable material may degrade readily within about an hour or a few hours after exposure to water. The degradation time can be relatively short where clogging is expected to occur relatively fast, or where the benefit of increased infiltration and volume capture is desired quickly following installation. Elements that are capable of undergoing degradation within about 10 years following installation are expected to be sufficient for most, but not all, applications. It is desirable that the elements have sufficient balanced degradability characteristics such that they degrade rapidly enough in the environment in which they are placed to provide the increased area that is desired, yet slowly enough that they will not degrade during normal shelf life, storage or shipment time periods, and during addition of media.

The elements can degrade when they are exposed to the surrounding environment, for example when they are mixed with soil or other media. Degradation can also be induced or the rate of degradation can be increased by manually inducing the degradation. The term "manually inducing" means manipulating the surrounding environment in order to bring about the desired degradation. An example of manually inducing degradation is introducing water to bring about degradation of hydrolytically degradable material. Another example is to provide heat to bring about degradation of thermally degradable material. Manually induced degradation may be desirable because it allows greater control over the rate of degradation. Degradation rates can be estimated from actual times of degradation for degradable materials in similar environments or based on measurements from a variety of short- or long-term tests including, but not limited to, environmental chamber tests in which the temperature and humidity of the environment can be manipulated, water tests, microbiologically active tests (such as the aerobic and anaerobic tests recommended by ASTM), and composting tests that simulate soil degradation. There are a wide variety of United States and International tests available, such as ASTM and ISO tests for biodegradable and compostable materials. The present method is not necessarily limited to materials that are classified as degradable using one or more of these tests.

The degradable elements are used directly or are used with one or more porous media. For example, a plurality of degradable elements can be added to (mixed with) a porous media such as sand or soil. The porous media used can be natural media, manufactured media, or a combination of the two. A first media can be the media for which the increased area for flow is desired. A second media can be the media comprising of the plurality of degradable elements. There are a large number of media that could be the first media, including, but not limited to, sand, gravel, soil, engineered soil, limestone, dolomite, activated carbon, activated alumina, iron oxide, coated sand, compost, peat, wood such as wood chips, shredded tires.

Depending on the composition of the elements, the elements may degrade into a granular media comprising of smaller elements, referred to here as a third media. Preferably, the first and third media differ in one or more properties that affect permeability or the rate of change in the permeability due to clogging, such as physical properties or composition. For example, the third media can be coarser than the first media, or of larger effective particle size, or have a smaller uniformity coefficient (more uniform particle size distribution) so that the potential for clogging is relatively lower than that of the first media. The first and third media can be different based on, but not limited to, differences in particle size or particle size distribution, particle shape, proportion of fine particles, uniformity coefficient, porosity, pore size, pore size distribution, composition, surface properties, or any combination of these. A specific example is a first media that is a soil and a third media that is a relatively coarser polymer media. Another example is fine sand as the first media and relatively coarser perlite as the third media. There are a large number of media that could be the third media, including, but not limited to, sand, gravel, soil, engineered soil, perlite, lightweight aggregate such as expanded clay, shale and slate, plastics, polymer composites, expanded polystyrene, geotextile, foams, pumice, limestone, dolomite, activated carbon, activated alumina, iron oxide, coated sand, compost, peat, bamboo, wood such as wood chips, and shredded tires. These media can be used to form degradable elements by, for example, use of degradable materials such as a degradable resin to bond the media elements.

In one embodiment, a plurality of degradable elements comprising of solid composite elements are used to increase the area available to pass flow. The first media is the media for which the increased area for flow is desired. The second media comprises of a plurality of degradable elements made of solid composite material capable of degrading into a third media that is a porous granular media. The degradable material of the elements is selected so that degradation is expected to occur within about 5 years following installation of the media. In this embodiment, the first and second media are mixed. Following installation, the elements are allowed to degrade resulting in a plurality of high surface area regions comprising of a third media. The third media resulting from degradation of the elements has a uniformity coefficient that is less than that of the first media.

FIG. 1-A shows example degradable elements made partly of degradable material and partly of conventional granular media. Elements 4 shown are organic shape, but can be any shape and size and can be solid or hollow. The desired increase in area available for flow is provided when elements 4 undergo degradation into granular media. FIG. 1-B shows the high surface area regions 5 created when elements 4 degrade. Flows can pass from the high surface regions 5 into surrounding media through porous interfaces 6.

FIG. 2-A shows example degradable elements made partly of degradable material and partly of porous matrices and mesh material. Elements 7 shown are organic shape, but can be any shape and size and can be solid or hollow. The desired increase in area available for flow is provided when elements 7 undergo degradation into the porous matrices. FIG. 2-B shows the high surface area regions 8 created when elements 7 degrade. Flows can pass from the high surface regions 8 into surrounding media through porous mesh interfaces 9.

FIGS. 3-A and 3-B show an example use of degradable elements to create the desired increase in flow area in an open media bed. FIG. 3-A shows the installed media comprising of a plurality of degradable elements 7 added to a media 10 for which the increase in flow area is desired. Following installation of the media, the degradable elements 7 are allowed to degrade to increase the area available for flow. FIG. 4-B shows the media bed following degradation of elements 7 into a plurality of high surface area regions 8. The degradation of elements 7 can occur when it is exposed to the environment or it can be induced (e.g. hydrolytically by introducing water, thermally by heating, or other means appropriate to the type of degradable material used). In FIG. 4-B, contaminated water can pass into high surface area regions 8 before entering media 10 through porous interfaces between high surface area regions 8 and media 10.

The degradable elements can be used in a number of different situations. From the description above, a number of advantages of this new method for forming a filter become evident:

(a) The method involves use of degradable elements that increase the surface area available for passing contaminated water through a porous media, and can increase the area of media available for depth filtration and cross-flow filtration. This reduces the rate of clogging and the need for frequent maintenance, and directly reduces operating costs.

(b) The method involves use of degradable elements that can be manufactured from readily available materials, such as biodegradable polymers and polymer composites. Materials that both degrade relatively quickly and do not harm the environment can be used with the method.

(c) The improved service life provided by the method over traditional media filters increases flexibility in the design of contaminated water practices. Contaminated stormwater, wastewater, and agriculture treatment practices could be made smaller and operated at higher loading rates because the method is less prone to clogging. This is especially beneficial in urban areas, where space for installation of such practices is often constrained.

Although the description above contains specificities, these are not to be seen as limiting the scope of the new method but as merely providing illustrations of some of the expected common alternatives and embodiments. Thus, the scope of the new method should be determined by the appended claims and their legal equivalents, rather than by the examples given.

The invention claimed is:

1. A method for forming a filter for passing contaminated water, said method comprising: providing a first granular media for which an increase in area available to pass said contaminated water is desired, adding a second granular media comprising of a plurality of elements that are made wholly or partly of degradable material, and allowing said elements to degrade to bring about an increase in area of said first granular media available to pass said contaminated water.

2. The method of claim 1, wherein said degradable material is selected from the group consisting of biodegradable polymers, photodegradable polymers, hydrolytically degradable polymers, thermally degradable polymers, oxidatively degradable polymers, mechanically degradable polymers, biodegradable composites, photodegradable composites, hydrolytically degradable composites, thermally degradable composites, oxidatively degradable composites, mechanically degradable composites, and combinations thereof.

3. The method of claim 1, wherein the step of allowing said elements to degrade is accomplished by manually inducing degradation.

4. The method of claim 1, wherein said elements are of predetermined size and shape.

5. The method of claim 1, wherein the surface area of said elements is at least two times a smallest face area of said elements.

6. The method of claim 1, wherein degradation of said elements results in a plurality of high surface area regions capable of increasing depth filtration.

7. The method of claim 1, wherein degradation of said elements results in a plurality of high surface area regions comprising of macropore channels capable of increasing depth filtration.

8. A method for forming a filter for passing contaminated water, said method comprising: providing a first granular media for which an increase in area available to pass said contaminated water is desired, said first granular media having a first uniformity coefficient, adding a second granular media comprising of a plurality of elements that are made wholly or partly of degradable material, and allowing said elements to degrade into a plurality of high surface area regions comprising of a granular media having a second uniformity coefficient that is less than said first uniformity coefficient of said first granular media.

9. The method of claim 8, wherein said degradable material is selected from the group consisting of biodegradable polymers, photodegradable polymers, hydrolytically degradable polymers, thermally degradable polymers, oxidatively degradable polymers, mechanically degradable polymers, biodegradable composites, photodegradable composites, hydrolytically degradable composites, thermally degradable composites, oxidatively degradable composites, mechanically degradable composites, and combinations thereof.

10. The method of claim 8, wherein the step of allowing said elements to degrade is accomplished by manually inducing degradation.

11. The method of claim 8, wherein the surface area of said elements is at least two times a smallest face area of said elements.

12. The method of claim 8, wherein degradation of said elements results in a plurality of high surface area regions capable of increasing depth filtration.

13. The method of claim 8, wherein said elements are of predetermined size and shape.

14. A method for forming a filter for passing contaminated water, said method comprising: providing a first granular media for which an increase in area available to pass said contaminated water is desired, said first granular media having a first porosity, adding a second granular media comprising of a plurality of elements that are made wholly or partly of degradable material, and allowing said elements to degrade into a plurality of high surface area regions having a second porosity that is more than said first porosity of said first granular media.

15. The method of claim 14, wherein said degradable material is selected from the group consisting of biodegradable polymers, photodegradable polymers, hydrolytically degradable polymers, thermally degradable polymers, oxidatively degradable polymers, mechanically degradable polymers, biodegradable composites, photodegradable composites, hydrolytically degradable composites, thermally degradable composites, oxidatively degradable composites, mechanically degradable composites, and combinations thereof.

16. The method of claim 14, wherein the step of allowing said elements to degrade is accomplished by manually inducing degradation.

17. The method of claim 14, wherein said elements are of predetermined size and shape.

18. The method of claim 1, wherein said elements degrade within a desired time period based on environmental chamber tests.

19. The method of claim 8, wherein said elements degrade within a desired time period based on environmental chamber tests.

20. The method of claim 14, wherein said elements degrade within a desired time period based on environmental chamber tests.

* * * * *